July 26, 1938. W. J. PLEWS 2,124,746
METHOD FOR TREATMENT OF MATERIALS
Filed Dec. 17, 1934 4 Sheets-Sheet 1

Inventor,
William J. Plews
by George H. Souter
Attorney.

July 26, 1938.  W. J. PLEWS  2,124,746
METHOD FOR TREATMENT OF MATERIALS
Filed Dec. 17, 1934   4 Sheets-Sheet 2

Inventor;
William J. Plews
by George H. Smith
Attorney.

July 26, 1938.  W. J. PLEWS  2,124,746
METHOD FOR TREATMENT OF MATERIALS
Filed Dec. 17, 1934  4 Sheets-Sheet 3
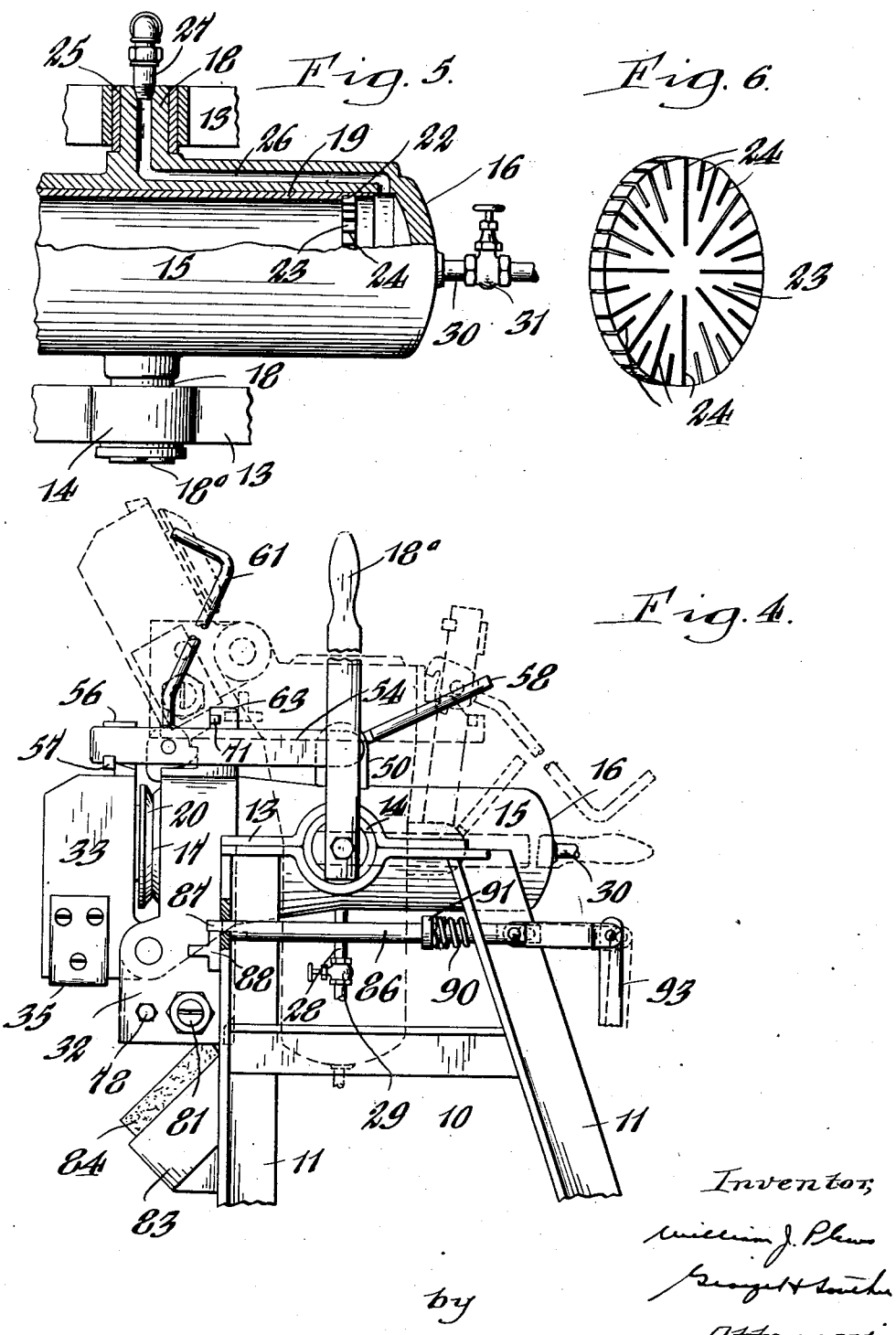
Inventor,
William J. Plews
George H. Fowler
by  Attorney.

July 26, 1938.   W. J. PLEWS   2,124,746
METHOD FOR TREATMENT OF MATERIALS
Filed Dec. 17, 1934   4 Sheets-Sheet 4
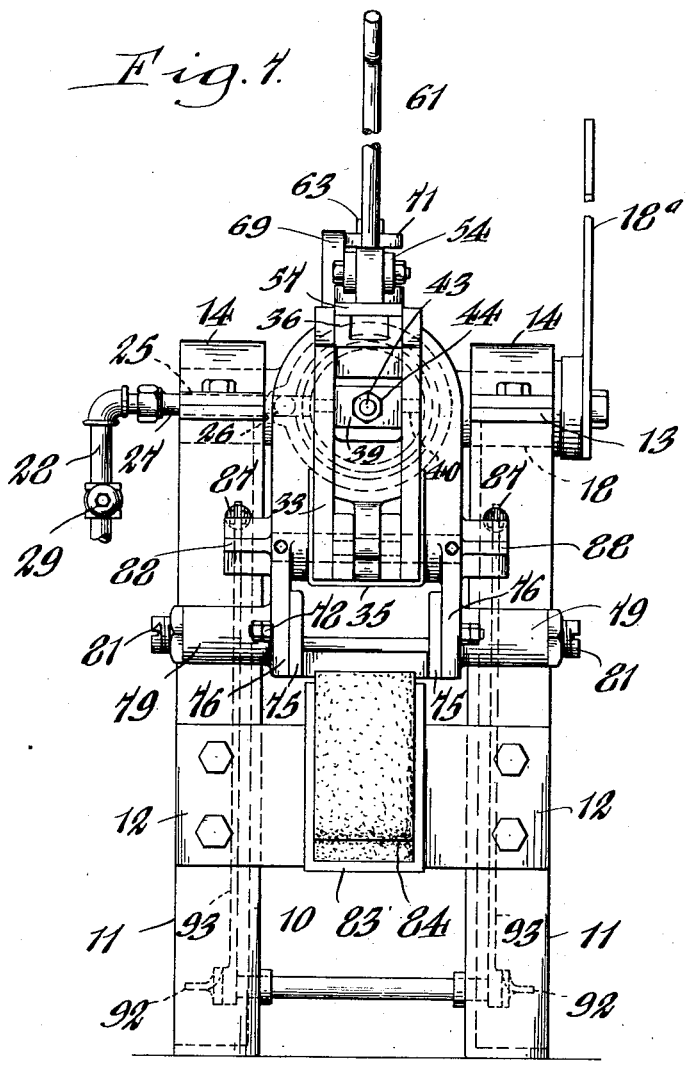
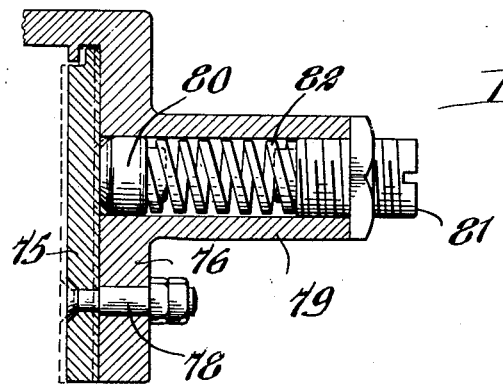

Patented July 26, 1938

2,124,746

UNITED STATES PATENT OFFICE 2,124,746

METHOD FOR TREATMENT OF MATERIALS

William J. Plews, Niagara Falls, N. Y., assignor to Plews Processes, Inc., a corporation of New York Application December 17, 1934, Serial No. 757,964

5 Claims. (Cl. 99—82)

The present invention relates to a method of treating materials, and the product of said method, and more particularly to a method of subjecting materials to the sudden pressure reduction or "explosion" process.

Broadly, the invention consists in the provision of a method whereby the material to be treated is placed in a closed vessel to which a heating medium is supplied in a particular manner, and permitted to remain therein for a predetermined period of time, after which the pressure in said receptacle is suddenly released in a novel manner, whereby the material is violently expelled from the receptacle.

I am aware that it is not new to subject materials such as wheat, rice and other starchy fibrous and/or crystalline substances, to a fluid under pressure in a closed vessel and suddenly release the pressure to puff, distintegrate, dehydrate, or otherwise change the physical and chemical properties of the same.

For example, one method commonly employed heretofore for puffing cereal grains consists in placing the grains to be puffed in a chamber or gun, raising the temperature and pressure within the gun by the application of external heat, rotating the gun during the heating operation, and subsequently suddenly reducing the pressure within the gun to expel the grains therefrom in the puffed condition. The time required for the heating operation is usually from thirty to forty-five minutes. During the heating operation the temperature of the wall of the gun is at all times considerably higher than that prevailing within the gun. In the treatment of cereal grains having a relatively high fat content, as for example oat groats, a partial decomposition of the fat content occurs when the grains are brought in contact with the inner surface of the chamber wall because of the high temperature of the latter. The resultant product will be extremely sensitive to the development of rancidity.

The method forming the subject-matter of the present invention, while of general application, is ideally suited to the puffing of oat groats, and will be described in connection therewith, but I wish it distinctly understood that the description is for purposes of illustration only and is not to be construed as in any way limiting the scope of the invention.

An object of my invention is to provide a method by which cereal grains having a relatively high fat content may be treated without danger of decomposing the fat content thereof to produce an extremely stable product which may be kept for an indefinite period of time without development of rancidity.

A further object of my invention is to provide a method of puffing cereal grains which results in a product, the individual grains of which are of substantially uniform size.

A further object of my invention is to provide a novel method for completely expelling from a pressure chamber material undergoing treatment therein upon sudden reduction of the pressure in the chamber.

A further object of my invention is to provide a novel method for preventing damage to the material undergoing treatment by the medium employed for raising the temperature and pressure within the treating chamber.

A further object of my invention is to provide a novel food product.

Other objects, features and advantages will appear as the description proceeds.

In the accompanying drawings—

Figure 4 is a side elevational view of the device of Fig. 1.

Figure 5 is a fragmentary plan view of the pressure chamber partly in section.

Figure 6 is a perspective view of one type of diffusion member.

Figure 7 is an elevational view of the device of Fig. 1, and

Figure 8 is a fragmentary sectional view of certain details.

Figure 1:
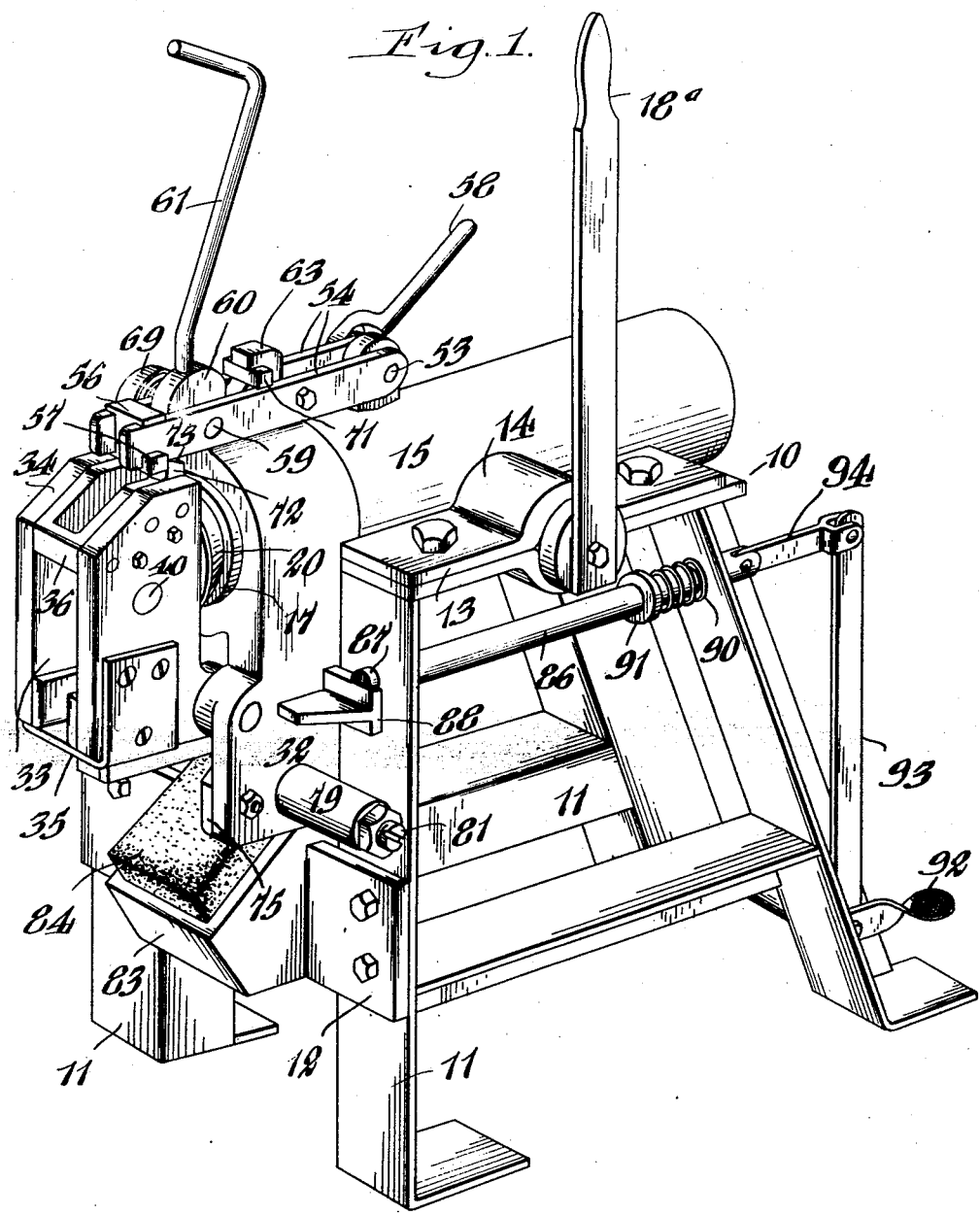
Figure 1 is a perspective view of a device whereby my present invention may be practiced.

In carrying out my invention, the oat groats are placed in a treating chamber which is then closed and a fluid under pressure and at an elevated temperature is admitted thereto, the fluid, however, being diffused before it comes in contact with the groats. Preferably this may be accomplished by providing a perforated baffle or partition within the chamber, but any suitable manner for effecting diffusion of the incoming fluid may be employed, the important point being to eliminate a concentrated application of the fluid to any portion of the mass undergoing treatment. Preferably the chamber is provided with a vent or other means to permit the air contained therein to escape as the fluid enters. It is desirable that all of the air be removed from the chamber to prevent the formation of air pockets which are detrimental to the successful treatment of that portion of the mass lying in the zone of the pocket.

After the groats have remained in the chamber for the necessary period of time, the pressure therein is suddenly released, as by releasing a closure member at one end of the chamber, and the groats are forcibly discharged from the chamber in the puffed condition.

An important feature of my invention is the application, at the instant of discharge, of a secondary supply of fluid medium moving in the same direction as the oat groats. The effect of so doing is two-fold. First, the fluid medium so applied serves in a degree to maintain the pressure differential between the interior and exterior of the individual grains at a minimum until the grains reach the atmosphere, when the full advantage of substantially instantaneous reduction of pressure may be enjoyed. The result is that all of the grains are puffed to substantially the same degree. I have found that when a secondary supply of fluid is not used, those grains which are remote from the discharge end of the chamber are puffed to a lesser degree than those which are close to the discharge opening, because of the somewhat slower pressure reduction to which the former are subjected.

A second advantage of applying a secondary supply of fluid is that the fluid so supplied entrains any groats which might have a tendency to remain in the chamber after discharge, thereby effecting complete evacuation of the chamber and increasing the efficiency and economy of the operation.

In the accompanying drawings, I have illustrated one form of apparatus which may be employed for carrying out my method. Referring to the drawings, reference numeral 10 designates generally a carriage or cradle on which the device is mounted and which consists of a pair of standards 11 adapted to be firmly bolted or otherwise secured to a floor or other foundation. Said standards are connected to each other by means of a tie-plate 12. To provide a convenient means for pivotally mounting the pressure chamber, the top portion of each standard 11 is in the form of a pair of plates 13, having central adjacent semi-circular portions defining bearings 14.

Figure 2:
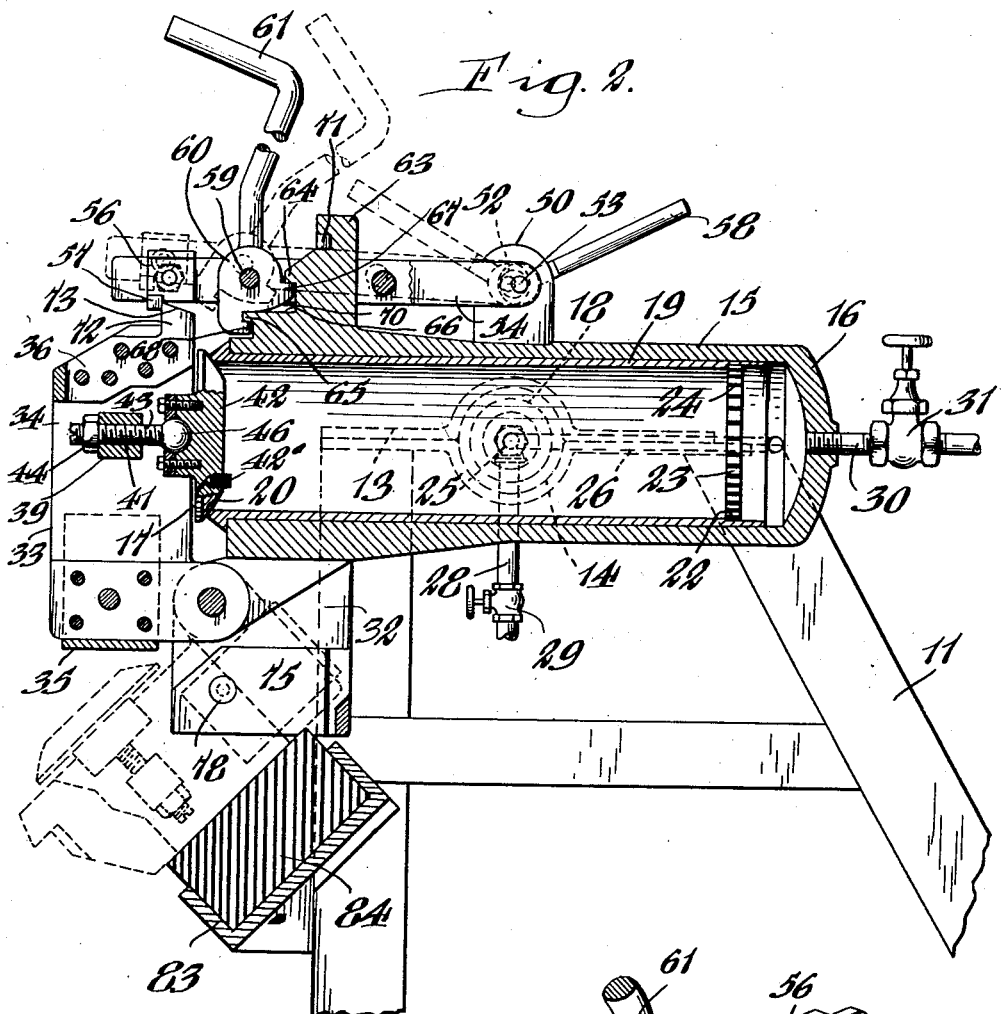
Figure 2 is a side elevational view thereof in section.
Figure 3:
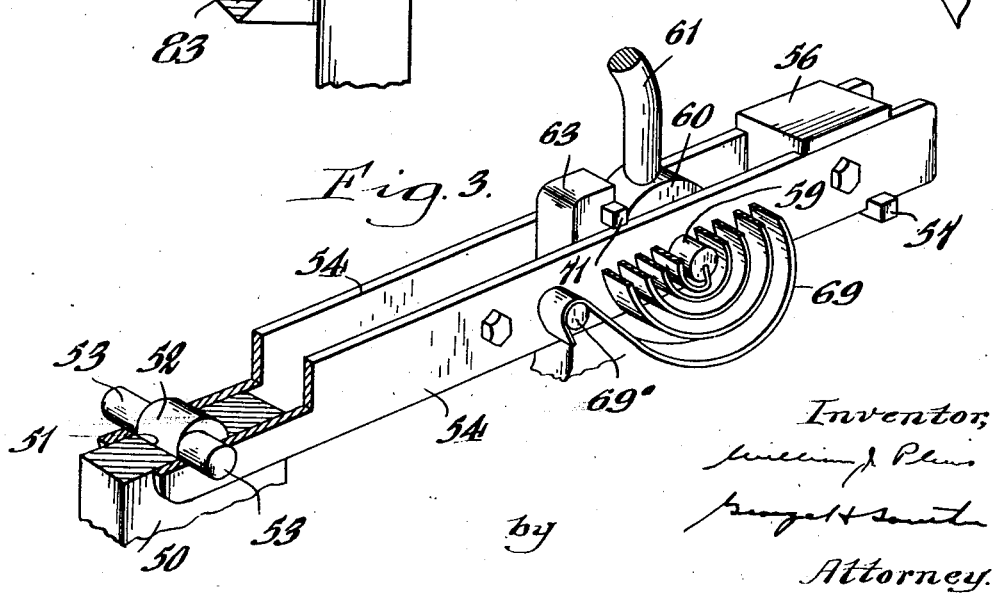
Figure 3 is a perspective view, partly in section, of a portion of the mechanism adapted to coact with the valve closure member of the treating chamber.

The pressure chamber as shown in detail in Figs. 2 and 5, consists of a relatively heavy cylindrical member 15, having a closed end 16 and an open end 17. Member 15 is preferably made of cast steel and cast integrally therewith is a pair of trunnions 18 adapted to be positioned within the bearings 14 to pivotally support the pressure chamber for rotational movement in a vertical plane. The chamber is rotated on said trunnions by manually manipulating lever 18a. Positioned within member 15 and concentric therewith is a tubular lining member 19 preferably made of non-oxidizing material such as stainless steel, Monel metal, or the like. One end of member 19 is spaced a short distance from the closed end 16 of member 15, and the other end projects through the open end of said member. The projecting portion is somewhat enlarged and is spherically ground to provide a valve seat 20. The wall of member 15 is increased in thickness at the open end for the purpose of strengthening the same. The inner end of tube 19 is counterbored to provide a shoulder 22 against which is positioned a disc or diffusion plate 23, having a plurality of apertures 24, which as shown, are in the form of slots. The diffusion member is in effect a partition which divides the pressure chamber into two communicating chambers, the forward one of which serves as a treating chamber and the other as a fluid-receiving and storing chamber.

Communication is afforded to the interior of the pressure chamber through passageway 25 formed axially of one of the trunnions 18, and passageway 26 formed in the wall of member 15. One end of passageway 26 communicates with passageway 25 and the other end terminates adjacent the closed end 16 of the chamber. Passageway 25 is in communication with a source of supply of fluid under pressure through nipple 27 and conduit 28. Nipple 27, which is stationary, is shown as having a screw-threaded end extending into passageway 25 and engaging screw threads formed in the wall thereof to permit of relative angular movement between said nipple and trunnion 18 as the pressure chamber is rotated about said trunnion. The admission of fluid to the pressure chamber is controlled by manually operated valve 29. The closed end 16 of the chamber is provided with an outlet 30 controlled by a valve 31.

Journalled in a pair of spaced plates 32 formed integrally with member 15 is a valve yoke 33, which consists of a pair of vertical plates 34 joined at their lower ends by straps 35 and at their top portions by member 36. Extending between plates 34 and journaled therein is a bar 39 having reduced end portions 40, and having a centrally positioned and threaded aperture 41 adapted to be brought into alignment with the longitudinal axis of the pressure chamber when the yoke is in the valve-closing position. The open end 17 of the pressure chamber is closed by a spherically ground valve or closure member 42 carried by a threaded valve spindle 43, which is threaded through aperture 41 and held in position by means of lock-nut 44. Valve 42 is connected to spindle 43 by means of a ball and socket joint 46. Valve 42 is provided with leak-port 42a.

Mounted on member 15 and preferably cast integrally therewith, is a vertical lug 50, having an aperture 51 in which is positioned a shaft 52. The ends of shaft 52 are reduced to provide a pair of aligned cranks 53, which are eccentrically arranged with respect to said shaft. A rod 54 is mounted on each crank 53. Said rods extend in substantially parallel relationship and at their free ends support a detent block 56 having a detent 57 formed in its under surface. A lever or handle 58 is mounted on one of said cranks in such a manner as to rotate therewith. Intermediate their ends rods 54 are joined by a shaft or pin 59 on which is mounted a cam 60, which is adapted to be rotated by cam handle 61. Adjacent its open end, member 15 is provided with an integral vertical portion 63 provided with teeth 64 and 65 and an intermediate flat surface 66. Cam 60 is provided with a pair of teeth 67 and 68 which are adapted to engage with teeth 64 and 65 respectively when the handle 61 is rotated in a counter-clockwise direction (looking at Figs. 1, 2 and 4) to positively lock rods 54 and detent 57 in their lowermost position, illustrated in Fig. 1. A spiral spring 69, having one end secured to the shaft 59 and the other end hooked over a pin 69a carried by one of the rods 54, tends to hold the cam in this position. The cam surface, indicated by the numeral 70, is so designed that, upon rotation of the handle 61 in the clockwise direction, it will coact with surface 66 to elevate the rods 54 and detent 57 to their upper, or closure-releasing position, illustrated in dotted lines in Fig. 2. A stop member 71 is provided in the upper portion of member 63, to limit the upward movement of rods 54. Looking at Fig. 2, it will be noted that detent 57, when in its lower position, is in the path of travel of projecting portion 72 of member 36. The upper surface of portion 72 is inclined as indicated at 73, to permit the detent to ride over said surface when the valve is being closed.

A pair of friction plates 75, carried by lugs 76 depending from casting 15 are provided for frictional engagement with the vertical ends of strap 35 during the opening movement of the valve to dissipate some of the energy of the valve and associated mechanism. The bearing force exerted by plates 75 on strap 35, and consequently the amount of energy dissipated through frictional engagement of the plates with said strap, is regulated by adjustment of a pair of springs, one of which acts on each plate. In Fig. 8 I have shown one such spring. Plate 75 is loosely supported by pin 78 for limited movement. A hollow boss or lug 79 extends from member 76 and within said boss is a thrust member 80 bearing directly on plate 75. Threaded through the open end of said boss is an adjusting screw 81, and positioned between said screw and said thrust member is a helical spring 82. Spring 82 tends to hold plate 75 in the dotted line position shown in Fig. 8. Obviously, adjustment of screw 81 will vary the tension of spring 82 and will definitely affect the magnitude of the energy dissipated through frictional engagement of the strap with plates 75, as the valve yoke passes between said plates during the opening movement. The residual energy is absorbed by a resilient member, preferably a solid block of rubber which is positioned in the path of travel of the valve yoke. As shown, a pocket 83 is formed in the tie-plate 12 and a solid block of resilient material 84 is placed therein at such an angle that its upper surface is parallel to the contacting surface of the valve yoke at the instant of contact. Block 84 serves as a cushion stop member to yieldingly limit the downward movement of the valve mechanism. Springs 82 may be so adjusted that the impact of the valve mechanism on block 84 will be relatively light and the valve mechanism will come to rest thereon. Or, if desired, the adjustment of springs 82 may be varied to permit an impact of sufficient magnitude to cause the return of the valve mechanism, due to the resiliency of block 84, to a position between plates 75 where it will be held by said plates in convenient position for subsequent manual closing.

The pressure chamber may be locked in the horizontal position to prevent accidental rotation by the reaction incidental to sudden pressure release by a pair of rods 86, one of which is mounted in each standard 11, as shown in Figs. 1 and 7. The forward ends 87 of the rods are reduced in size to fit through apertures formed in the forward legs of standards 11, and are provided with flat under surfaces adapted, when the gun is in the horizontal position, to rest upon the upper surfaces of plates 88, one of which extends from each side of casting 15, thus locking the chamber in the horizontal position. The rods are urged in the forward or locking position by springs 90 acting on collars 91, there being one spring and one collar mounted on each rod. The rods are withdrawn from the locking position by depressing either one of a pair of foot pedals 92, each of which forms an arm of a bell crank lever 93, one of said levers being connected to each rod 86 through a link 94. Both pedals are mounted on shaft 95 for simultaneous rotational movement. Thus, depression of either pedal will release both rods and permit the chamber to be rotated to the vertical position for loading.

In operation the pressure chamber is rotated on trunnions 18 by means of lever 18a until it assumes the vertical or loading position illustrated by dotted lines in Fig. 4. In this position valve 42 is swung free from the chamber opening. Oat groats are poured into the chamber through its open end until the treating zone is substantially filled. It will be noted that disc 23 prevents the material from entering the fluid-receiving zone adjacent the closed end of the chamber. Valve yoke 33 is rotated on its pivot to bring valve 42 into the closed position. Cam handle 61 is rotated in the counter-clockwise direction, causing teeth 67 and 68 to engage teeth 64 and 65 to positively hold rods 54 and detent 57 in the downward positions. Shaft 52 is then rotated in the clockwise direction by means of lever 58, causing rods 54 to be moved to the right (looking at Fig. 2). This movement of rods 54 will cause detent 57 to be brought into engagement with projection 72. As further pressure is applied to the lever 58, valve 42 obviously will be brought into tight engagement with valve seat 20. The ball and socket connection permits limited universal movement of the valve. Due to the fact that the valve is spherically ground, it will seat in any position within the limits of said movement. Because of the swivel mounting of supporting bar 39, pressure will be uniformly applied to the valve, irrespective of the position it assumes. If the valve should become worn, it can be adjusted by loosening lock-nut 44 and turning spindle 43. Valve 31 may be opened at this point to drain off any condensate which may be present in the chamber, or, if the chamber is cool, to permit the fluid to blow through outlet 30 to raise the temperature of the chamber and the chamber wall. After valve 31 has been closed, valve 29 is opened to admit fluid under pressure to the chamber. The fluid enters the fluid-receiving zone of the chamber from passageway 26 and is broken up into a series of fine streams by diffusion member 23. As the fluid progresses toward the forward end of the chamber, it forces the air contained therein through leak-port 42a, to the atmosphere. It is highly desirable that, in apparatus of the character in question, all of the air be removed from the chamber to prevent the formation of air pockets in the zone occupied by the oat groats.

The chamber is then rotated to the horizontal or discharge position shown in Figs. 2 and 4. After the material has remained for the necessary period of time, valve 29 is closed and handle 61 is rotated in the clockwise direction, (looking at Fig. 2), causing teeth 67 and 68 to become free from engagement with teeth 64 and 65, and causing rods 54 to be elevated by the action of cam surface 70 on surface 66. As soon as detent 57 has been raised to the position where it is clear of projection 72, valve 42 and yoke 33 will be violently swung to the open position by the pressure of the fluid within the chamber, and the material therein will be forcibly, and substantially instantaneously, discharged therefrom.

Good results may be obtained in the puffing of oats by using as a fluid medium super-heated steam at approximately two hundred pounds gauge pressure, and carrying from 50° to 200° F. of super-heat. The steam is admitted to the treating chamber in the diffused condition, as by dividing it into a plurality of fine streams, after the groats have been placed in the chamber and the latter tightly closed. The groats are then permitted to remain in the chamber for a period of from one and a half to two minutes. The length of time of treatment, the degree of super-heat of the steam and its pressure depend upon the moisture content of the groats and can be readily determined by a few tests under varying degrees of super-heat for different periods of time.

The advantages of my invention will now be fully appreciated. During the period the oat groats remain in the chamber, their pores become thoroughly impregnated with superheated steam. When the pressure is suddenly released, the steam escapes from the pores with sufficient vigor to cause disruption of the cell walls and enlargement or puffing of the groat. This action is probably enhanced by the flashing into steam of a large portion of the natural moisture content of the groat, resulting in partial dehydration of the groat. Obviously, the less suddenly the pressure is released, the less vigorously the steam will tend to escape from the interior of the groat, and the less the size of the groat will be increased. As the groats remote from the open end of the chamber must travel the entire length of the treating chamber before they reach the atmosphere, they would normally be subjected to less sudden pressure reduction than those adjacent the open end of the chamber. According to my invention, the reduction of pressure within the treating zone of the chamber is retarded in a degree by the steam stored in the fluid-receiving zone which expands into the treating zone as the pressure therein tends to diminish. Although the actual period of time required for complete reduction of pressure is prolonged but a fraction of a second by said secondary steam supply, it assists in permitting substantially uniform puffing of the entire mass of groats. Also, as mentioned above, as said secondary steam supply rushes toward the open end of the chamber, it carries with it any groats which may tend to remain in the chamber.

A further advantage obtained when my process is employed for treating foodstuffs having a delicate flavor is that, because of the extremely short period of time required for treatment, and of the manner in which the steam is supplied to the treating chamber, that is, in the diffused condition, the flavor of the substance undergoing treatment is not impaired.

In the above I have described one manner in which my invention may be carried out. Many modifications will occur to those skilled in the art. For example, the diffusion of the fluid may be accomplished in many different ways. The secondary fluid supply may be stored outside the chamber, as well as within the confines of the chamber. The particular fluid medium employed may be varied to suit different conditions. When it is desired to puff or disintegrate at room temperature, carbon dioxide gas, compressed air, or any suitable fluid medium may be employed. It is the intent that this patent shall cover all such modifications as come within the scope of the appended claims.

Having thus described my invention, what I claim as new and desire to secure by Letters Patent of the United States is:

1. A method of manufacturing ready-to-eat puffed oats possessing a commercially useful shelf-life which comprises placing a quantity of oats in a closed chamber having an inlet at one end and an outlet at the other, admitting to said chamber, substantially simultaneously over its entire cross-sectional area, superheated steam so as to expel therefrom the therein contained air, closing said outlet to build up a pressure in the chamber to cook the raw oats without deteriorating the oil contained in them, and suddenly releasing the pressure while admitting a secondary supply of superheated steam under pressure to said chamber.

2. The method of preparing a ready-to-eat food product possessing a commercial shelf-life from oat grains by the explosion process which consists in placing a body of raw oat grains to be treated in a pressure chamber, uniformly subjecting said body of raw oat grains throughout substantially its entire cross-sectional area to the action of steam under superatmospheric pressure and carrying 50° to 200° F. superheat for a period not in excess of two minutes thereby simultaneously uniformly cooking the oat grains without decomposing the natural oil content thereof, and then suddenly releasing the pressure in said chamber to expel and substantially uniformly expand the oat grains.

3. The method of preparing a ready-to-eat food product possessing a commercial shelf-life from oat grains by the explosion process which consists in placing a body of raw oat grains to be treated in a pressure chamber, uniformly subjecting said body of raw oat grains throughout substantially its entire cross-sectional area to the action of superheated steam under superatmospheric pressure for a period not in excess of two minutes thereby simultaneously uniformly cooking the oat grains without decomposing the natural oil content thereof, and then suddenly releasing the pressure in said chamber to expel and substantially uniformly expand the oat grains.

4. The method of preparing a ready-to-eat food product possessing a commercial shelf-life from oat groats by the explosion process which consists in placing a body of raw oat groats in a pressure chamber, uniformly subjecting said body of raw oat groats throughout substantially its entire cross-sectional area to the action of superheated steam under superatmospheric pressure to simultaneously uniformly cook the oat groats over said cross-sectional area without decomposing the natural oil content thereof, and then suddenly releasing the pressure in said chamber to expel and substantially uniformly expand the oat groats.

5. The process of producing substantially non-rancidifiable expanded oats which comprises confining the oats in a closed air-containing space, expelling the air from said space by means of a mass of highly heated steam introduced substantially uniformly over the cross-sectional area of said space so as rapidly to envelop the oats substantially uniformly with a non-oxidizing heated atmosphere maintained under a superatmospheric pressure, maintaining the temperature sufficiently high to cook the oats in a period of time not substantially exceeding two minutes, whereby the fatty constituents of the oats remain unaffected, and then suddenly releasing the pressure.

WILLIAM J. PLEWS.